United States Patent [19]

Dugua

[11] 4,317,802

[45] Mar. 2, 1982

[54] PROCESS FOR SEPARATING MOLYBDENUM AND/OR OTHER METALS CONTAINED IN RESIDUAL ORGANIC EFFLUENTS

[75] Inventor: Jacques Dugua, Charly, France

[73] Assignee: Metaux Speciaux, Paris, France

[21] Appl. No.: 204,340

[22] Filed: Nov. 5, 1980

[30] Foreign Application Priority Data

Nov. 27, 1979 [FR] France .................. 79 29610

[51] Int. Cl.³ ................................ C01G 39/00
[52] U.S. Cl. ................................ 423/55; 423/53; 423/64; 423/65; 423/85; 75/108; 252/420
[58] Field of Search ................ 423/53–55; 75/108, 121; 252/420

[56] References Cited

U.S. PATENT DOCUMENTS

3,763,303 10/1973 Khuri et al. .................. 423/54
3,887,361 6/1975 Lemke .......................... 75/108
4,046,852 9/1977 Vertes et al. .................. 423/54

FOREIGN PATENT DOCUMENTS

1317480 5/1973 United Kingdom .............. 423/53

OTHER PUBLICATIONS

Watanabe et al., "Chemical Abstr.", vol. 81, 1974, #39646m, pp. 140–141.

Primary Examiner—Herbert T. Carter
Attorney, Agent, or Firm—Dennison, Meserole, Pollack & Scheiner

[57] ABSTRACT

The process relates to the separation of the molybdenum and/or tungsten, titanium, vanadium, niobium or tantalum present in the form of organometallic compounds in residual effluents.

It is applicable, in particular, to the effluents originating from the epoxidation of olefins by hydroperoxides.

The process involves treating the effluent with from 1 to 10% by weight of water, at between 150° and 220° C. under pressure, to render the metals listed above insoluble, without forming a distinct aqueous phase. The solid phase containing more than 95% of the metals is separated by filtration. After treatment, the effluents can be used without disadvantage, for example as a fuel, and the metals can be recovered from the solid phase.

4 Claims, No Drawings

PROCESS FOR SEPARATING MOLYBDENUM AND/OR OTHER METALS CONTAINED IN RESIDUAL ORGANIC EFFLUENTS

The process forming the subject of the invention relates to the separation of the molybdenum and/or tungsten and/or titanium and/or vanadium and/or tantalum and/or niobium present in the form of organometallic compounds in residual organic effluents.

More specifically, the process permits the treatment of residual organic effluents formed during chemical operations in which one or more of the metals just listed is used as catalyst in the free or combined state, the majority of which subsequently assumes the form of organometallic compounds in residual effluents. Residual effluents of this type originate, for example, from the epoxidation treatment of olefins by means of hydroperoxides. These treatments are described in French Pat. Nos. 1460520, 1462490, 1465902, 1469326, 1487076, 1495694 and 1548367, filed by Halcon International Inc. These patents point out that, after having separated the epoxides and certain by-products by distillation, there remains a liquid residual organic effluent containing molybdenum and/or one or more of the metals listed above. For the various uses of these effluents and, in particular, in the frequent case where they are to be used as fuel, it is very important to free them of their content of molybdenum and/or one or more of the other metals listed above owing to the toxicity of the metal oxides which would be produced during combustion. It is also of value to be able to recover the molybdenum and/or the other metals in a useful form.

A certain number of methods have been proposed for removing, for example, the molybdenum from these effluents. Thus, U.S. Pat. No. 3,463,604 describes a process in which the Mo contained in the residual organic effluents is precipitated by means of an aqueous solution of ammonium phosphate. An aqueous solution containing from 5 to 20% of ammonium phosphate which is mixed with the effluents in a proportion of from 4 to 5% by weight is preferably used. An insoluble ammonium phosphomolybdate is obtained and is separated by filtration. Unfortunately, the precipitation yield of this phosphomolybdate is uncertain, particularly if the effluent contains organic compounds having a high molecular weight, as indicated by table II of the patent. The Mo contents remaining after treatment in the effluents are still several hundreds ppm and, even in the most favourable case where the treatment temperature has been brought to 148° C. (300° F.), the remaining Mo content is still 160 ppm.

French Pat. No. 2085941 describes another method of separating the Mo, in which the organic effluents are placed in contact with an aqueous phase so as to cause the molybdenum compound or compounds to pass into the aqueous solution. The tests show that a large volume of water of between 0.4 and 8 times the volume of organic solution has to be used to extract the molybdenum from them. The treatment is preferably carried out at between 70° and 100° C. with optional addition of ammonia. The yield of Mo extracted varies between 80 and 100% according to the tests. This yield is particularly high if the ratio between the volumes of water and organic phase is high.

This process has a primary major disadvantage in that it transfers into an aqueous phase which is very abundant in volume not only the soluble molybdenum compounds but also the organic compounds which are also soluble in water, such as polyols which are very frequently present in these effluents. It is therefore necessary, if the molybdenum and also the other soluble compounds are to be recovered, to treat this aqueous phase in a subsequent stage by precipitating, for example, the molybdenum using a suitable reagent in the form of an insoluble compound, after which the polyols can be separated in azeotropic form by distillation. It is seen that this is therefore a complex and expensive process, particularly if wastage of the aqueous solutions containing the organic compounds and the Mo is to be avoided. The addition of ammonia, which is usually desirable, in particular, for neutralising the acids, further increases significantly the cost of the treatment. Moreover, the organic ammonium salts thus formed are found, at least in part, in the aqueous phase. It is thus seen that this process does not permit easy recovery of the Mo present in the effluents and necessitates expensive consecutive operations.

Finally, U.S. Pat. No. 3,887,361 describes a process for the treatment of the same residual organic effluents containing one or more organometallic compounds of Mo and/or W, Ti, V, Nb or Ta with tertiarybutyl alcohol. It involves adding from 5 to 50% of tertiarybutyl alcohol to the effluent, then heating the mixture to between 100° and 300° C. It is observed that, under these conditions, the Mo is rendered largely insoluble and it is therefore possible to separate it from the effluent by filtration. This process, which has the advantage of simplicity since a single treatment followed by filtration is needed to recover the majority of the molybdenum, has two disadvantages. Firstly, a relatively large quantity of tertiarybutyl alcohol is used, a proportion of which will remain mixed with the effluent and therefore will probably only be recovered as fuel. This makes the process relatively expensive. Moreover, the application of this process necessitates the use of autoclaves operating under high pressure in which, the higher the pressure, the greater the effectiveness of separation (see Table, column 3).

A more economical process avoiding the consumption of expensive reagents or the production of complex fittings and permitting high and reproducible yields in the elimination of the Mo and/or the other metals listed above to be obtained in all cases has therefore been sought.

The process forming the subject of the invention involves adding to a residual organic effluent, such as those obtained during the treatment of olefins with hydroperoxides according to the above-mentioned patents belonging to Halcon International, having a content of Mo and/or W, and/or Ti, and/or V, and/or Nb, and/or Ta, of between 0.1 and 1% by weight, a quantity of water which is smaller than that needed for the appearance of a distinct aqueous phase and is between 1 and 10% by weight of this effluent, at a temperature of between 150° and 220° C. under pressure. Owing to this treatment, the molybdenum and/or the other metals are rendered insoluble and can then be separated easily by mere filtration.

The tests have shown that, providing a sufficient quantity of water is introduced and providing that the small quantity of water is suitably dispersed in the organic phase either as soon as it is introduced or during the treatment under pressure at between 150° and 220° C. and, finally, providing that this treatment is carried out for a sufficiently long period, e.g. from about 2 hours to about 10 hours a precipitation yield which is clearly higher than 95% and which exceeds 98% in the majority of cases is obtained. The process can be carried out under a pressure of from 10 to 40 bars, the most favourable range for reasons of economy in the construction of autoclaves lying between 15 and 25 bars.

The following examples describe, but do not limit, the methods of carrying out the invention for obtaining particularly effective results.

EXAMPLE 1

A sample of residual organic effluent originating from the epoxidation of olefins with hydroperoxides in the presence of a molybdenum-based catalyst according to the Halcon International Inc. processes is used. The Mo content of this sample is 0.31% by weight.

In a first control test, 180 g of this sample are taken and are introduced under a nitrogen atmosphere into a stainless steel autoclave provided with an internal stirrer. The autoclave is brought to 200° C. and kept at this temperature for 6 hours under a pressure of from 20 to 24 bars with continuous internal stirring. After cooling, the contents of the autoclave are filtered. The precipitate retained on the filter is washed with acetone. A dark brown powdery product weighing 0.72 g and containing 48% by weight of Mo is obtained. The Mo content of the filtrate is 0.12% of Mo, demonstrating that about 61% of the Mo has been retained on the filter. A treatment of this type cannot therefore permit adequate purification of the effluent.

A second test is carried out on a new quantity of 150 g from the same sample. In this case, after introduction of the sample into the same autoclave, also under a nitrogen atmosphere, 10.5 g of water, that is to say 6.5% by weight, are added. The autoclave is maintained at 200° C. for 4 hours with continuous stirring under a pressure of from 16 to 20 bars. After cooling, the contents of the autoclave are filtered and the product retained on the filter is washed with acetone. A dark brown powdery product weighing 0.95 g and containing approximately 47% of Mo is obtained. The Mo content of the filtrate is only 0.0040% by weight in this case, demonstrating that 98.7% of the Mo has been retained.

It is seen that the treatment according to the invention permits the Mo to be rendered insoluble virtually completely in a single operation.

EXAMPLE 2

A second sample of residual products from the Halcon processes, containing 0.28% of molybdenum was taken. A quantity of 970 g of this sample was introduced, under a nitrogen atmosphere, into a stainless steel 1.8 l autoclave containing an internal stirring system. 30 g of water, representing 3% by weight of the effluent, are added in the autoclave. The autoclave is brought to 200° C. and this temperature is maintained for 5 hours. During this period, the pressure is limited to 20 bars by automatic degassing of the vapour phase. At the end of the treatment, the autoclave is chilled and its contents filtered under pressure. After filtration and washing of the precipitate obtained with acetone, 5.86 g of dark brown, powdery product containing 46% of Mo are recovered. Quantitative analysis of the molybdenum in the filtrate indicates a content of 20 ppm of Mo, corresponding to a degree of separation of the Mo of 99.3%.

EXAMPLE 3

A continuous treatment test by the process according to the invention is carried out using a metering pump on the same sample of effluent containing 0.28% of Mo.

The pump injects the effluent, to which 5% by weight of water have previously been added, at a flow rate of 0.2 l/h, into a 1.8 l stainless steel autoclave whose contents are brought to 200° C. and stirred continuously by means of an internal stirrer. The residence time in the autoclave is approximately 6 hours. An automatic extraction system removes the product at a flow rate approximately equal to the rate of introduction. After cooling, the extracted product is filtered and the Mo is analysed in the filtrate. The Mo content in this filtrate is 138 ppm of Mo, demonstrating that 95% of the Mo has been extracted from the effluent by the treatment.

A simple calculation by the so-called cascade reactor method shows that it is sufficient to use 3 reactors in cascade with a residence time of 2 hours per reactor to bring the Mo content to less than 50 ppm.

The results obtained during these tests demonstrate the effectiveness of, and the simplicity in carrying out, the process according to the invention. It is understood that this effectiveness is particularly high if a mixture which is as intimate as possible is made between the small quantity of water introduced and the organic phase. The very great value of the process lies in the fact that the quantity of water introduced is sufficiently small to prevent an aqueous phase which is distinct from the organic phase from appearing after the treatment. Experience has shown that the very small quantity of water introduced, which is brought to a high temperature, permits decomposition of the organometallic compounds of Mo and/or of the other metals mentioned above which, are present in the effluent, thus leading to the formation of a solid phase containing virtually all the Mo and/or the other metals, if applicable. The subsequent separation of this phase by filtration does not present any particular problems.

During the treatment at between 150° and 220° C., it is generally worth limiting the pressure to approximately 20 bars for reasons of economy in the construction of the autoclaves.

I claim:

1. A process for separating molybdenum compounds contained in residual organic effluents from epoxidation of olefins with hydroperoxides, said process comprising:
    (1) Combining the molybdenum containing effluent with from about 1% to about 10% by weight water;
    (2) Heating the effluent and water mixture to a temperature of from about 150° C. to about 220° C. at a pressure of from about 10 bars to about 40 bars; and
    (3) Separating the solid phase.

2. A process according to claim 1, in which the mixture of effluent and water is heated for about 2 to about 10 hours at between 150° C. and 220° C. with continuous stirring.

3. A process according to claim 2, in which the mixture of effluent and water is heated for from about 2 to about 10 hours at between 150° C. and 220° C. with continuous stirring.

4. A process according to claim 1, 2, or 3, in which the mixture is heated from about 150° C. to about 220° C. under a pressure of from about 15 bars to about 25 bars.

* * * * *